May 29, 1951  J. W. PARKER  2,555,243

THREAD CONSTRUCTION

Filed Jan. 24, 1945

INVENTOR
John W. Parker
BY Barlow & Barlow
ATTORNEYS

Patented May 29, 1951

2,555,243

UNITED STATES PATENT OFFICE 2,555,243

THREAD CONSTRUCTION

John W. Parker, Barrington, R. I., assignor to Brown & Sharpe Manufacturing Company, a corporation of Rhode Island Application January 24, 1945, Serial No. 574,250

4 Claims. (Cl. 33—164)

This invention relates to a thread construction particularly as the same is used in connection with a micrometer caliper.

It is usual in thread and nut connections that the thread cross section is in the form of a V with a complementary cross section at the root of the thread in the wall of the opening which receives it for interlocking threaded engagement. In such a construction the bearing surface between the parts is along the angular inclination of the threads. It has been found that where a construction of this sort exists that a true concentric relation does not exist at all points of axial advancement between the parts.

One of the objects of this invention is to provide a truer concentric relation between two threadingly engaging parts as relative movement occurs.

Another object of this invention is to provide a concentric relationship between the micrometer caliper barrel and the thimble of the micrometer caliper in different positions of adjustment so that the marked edge of the thimble will always be the same distance from the marking on the barrel.

Another object of this invention is to secure the desired relative position of the two parts by modification of the threads which interengage between them.

Another object of this invention is to secure the true running relation of the order of a cylindrical fit while also providing the advantages of axial advancement of a threaded construction.

With these and other objects in view, the invention consists of certain novel features of construction, as will be more fully described and particularly pointed out in the appended claims.

Figure 1:
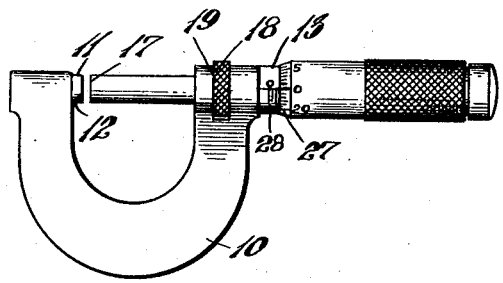
Fig. 1 is a top plan view of the micrometer caliper.
Figure 2:
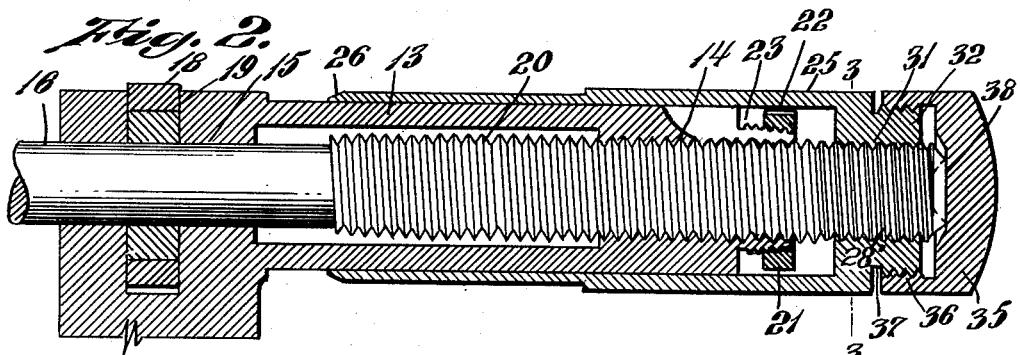
Fig. 2 is a sectional view of the spindle, thimble, and barrel.
Figure 3:
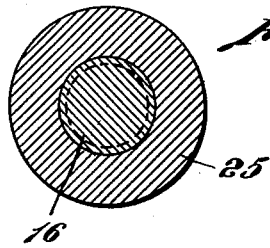
Fig. 3 is a section on line 3—3 of Fig. 2.

In proceeding with this invention the threaded socket and threaded spindle which engages therewith have the threads modified by the top of the threads of the spindle being flattened along the surface of a cylinder while the roots of the threads of the opening or socket are correspondingly flattened along the surface of the cylinders so that the bearings between the two will be as between cylinders. The arrangement is such that the bearing will be along the flattened top and flat root rather than along the inclined surface of the threads. The invention is shown as applied to a micrometer caliper.

With reference to the drawing 10 designates the arcuate frame of a micrometer caliper which carries an anvil 11 provided with a measuring face 12. A barrel 13 extends from the other arm of the arcuate frame 10 and is provided with a threaded opening 14 at the end thereof remote from the frame 10. A bore 15 provides a bearing for the spindle 16 which has a measuring face 17 to cooperate with the measuring face 12. The spindle may be held in locked position by the clamping ring 18 which is received in a recess 19 in the frame 10. The spindle 16 is provided with a micrometer screw 20 which has threaded engagement with the threads 14 in the barrel and will be axially advanced or withdrawn by relative rotation of this spindle and the barrel. A nut 21 is slotted as at 22 and engages threads 23 on the reduced end portion of the barrel so as to adjust for play in the threads between the barrel and the spindle.

Figure 4:
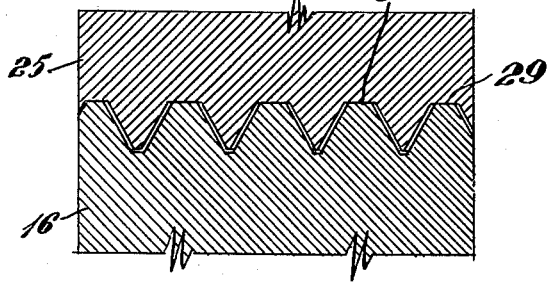
Fig. 4 is a greatly enlarged section of a portion of the threads which provide for the adjustment of the thimble relative to the spindle.

A thimble 25 is secured to the spindle 16 at its end distant from its measuring face. This thimble fits over the barrel 13 and is provided with a beveled edge 26 having markings 27 thereon (see Fig. 1) to cooperate with markings 28 on the barrel. It is desired that these markings 27 come close to the markings 28 in all positions of rotation of the thimble with reference to the barrel and consequently it is desirable that the thimble be truly concentric with the axis of the spindle. Adjustment is desirable at a time of first setting and as wear occurs between the thimble and the spindle, and while the convenience of a threaded engagement between the two is desirable in many instances a threaded engagement at this point might at some positions of adjustment cause some eccentricity between the thimble and the barrel at the measuring edge of the thimble. I have overcome eccentricity which occurs in the usual form of threaded engagement by modifying the thread at this point of connection. The threads on the spindle at the location 28' where the thimble connects therewith are flattened off at the top of these threads as shown at 29 in Fig. 4 and similarly I have flattened the roots as at 30 of the threaded socket or opening 31 in the end portion 32 of the thimble which receives this portion of the spindle. These flattened surfaces 29 and 30 are portions of a cylinder and provide bearing surfaces between the two as distinguished from the inclined surfaces of the threads. Thus, the effect of truly cylindrical surfaces bearing one on the other are provided in this construction which enables the true concentricity between the parts.

In order that the adjustment between the thimble and the spindle may be secured in a fixed relation I provide a cap 35 which has threaded engagement as at 36 with the reduced portion of the thimble 37. The inner end 38 of the cap engages the spindle and by screwing up this cap tightly against the end of the spindle a binding arrangement is secured to hold the thimble and spindle in adjusted position, causing the spindle, thimble, and cap to be in effect a single unit in functioning in the micrometer caliper.

It will, of course, be readily apparent that the threaded engagement which is shown between the spindle and the thimble may occur at any point where a threaded socket and spindle construction is desired and the claims which are presented are directed to the threaded construction alone as well as to its use in a micrometer caliper.

I claim:

1. In a thread and nut construction, a spindle provided with threads along its outer surface, a member having an opening provided with threads into which said threaded spindle extends, the threads on said spindle having converging sides and flat tops and the roots of the threads of said opening being correspondingly flattened with the sides correspondingly flaring, said flat tops and flattened roots providing the bearing engagement between said spindle and member and the converging and flaring sides being spaced said flat tops being located along a cylinder of uniform radius.

2. In a micrometer caliper, a spindle provided with threads along its outer surface, a thimble having an opening provided with threads to receive said threaded spindle, the threads on said spindle having flat tops and the roots of the threads of said opening being correspondingly flattened, said flat tops and flattened roots providing the bearing engagement between said spindle and thimble and the sides of the threads being spaced said flat tops being located along a cylinder of uniform radius.

3. A construction as set forth in claim 2 wherein means are provided to hold said spindle and thimble in adjusted position.

4. A construction as set forth in claim 2 wherein means are provided to hold said spindle and thimble in adjusted position comprising a cap threaded onto said thimble and engaging said spindle to bind the two together.

JOHN W. PARKER.

REFERENCES CITED

The following references are of record in the file of this patent:

UNITED STATES PATENTS

| Number | Name | Date |
| --- | --- | --- |
| 1,725,233 | Walker et al. | Aug. 20, 1929 |
| 1,766,635 | Holdaway | June 24, 1930 |
| 1,940,475 | Witchger et al. | Dec. 19, 1933 |
| 2,145,849 | Cram | Feb. 7, 1939 |
| 2,212,910 | Witchger | Aug. 27, 1940 |
| 2,278,377 | Cook | Mar. 31, 1942 |